United States Patent [19]
Fabian

[11] 3,872,103
[45] Mar. 18, 1975

[54] MANUFACTURE OF DEEP-SHADE 3,4,9,10-PERYLENETETRACARBOXYLIC ACID DIANHYDRIDE PIGMENTS

[75] Inventor: Wolfgang Fabian, Wilhelmsfeld, Germany

[73] Assignee: BASF Aktiengesellschaft, Ludwigshafen/Rhine, Germany

[22] Filed: Oct. 24, 1973

[21] Appl. No.: 409,091

[30] Foreign Application Priority Data
Oct. 26, 1972 Germany............................ 2252461

[52] U.S. Cl. .............................................. 260/333
[51] Int. Cl.............................................. C07d 9/00
[58] Field of Search ..................................... 260/333

[56] References Cited
UNITED STATES PATENTS
3,016,384  1/1962  Caliezi ............................... 260/208
3,124,565  3/1964  Schilling et al. ..................... 260/208
3,127,412  3/1964  Gaertner et al...................... 260/208

FOREIGN PATENTS OR APPLICATIONS
1,225,598  9/1966  Germany

*Primary Examiner*—Norma S. Milestone
*Attorney, Agent, or Firm*—Johnston, Keil, Thompson & Shurtleff

[57] ABSTRACT

A process for the manufacture of deep-shade perylene-3,4,9,10-tetracarboxylic acid dianhydride pigments, wherein finely ground crude pigment of which the average primary particle size is from 0.01 to 1 $\mu$ is treated with a primary or tertiary aromatic amine which is liquid at the treatment temperature, or with a strongly polar aprotic solvent, as swelling agent, until the pigment has acquired the optimum color strength. After removal of the swelling agent, a deep-shade, pure pigment is obtained, which is suitable for all pigmentation purposes.

8 Claims, No Drawings

MANUFACTURE OF DEEP-SHADE 3,4,9,10-PERYLENETETRACARBOXYLIC ACID DIANHYDRIDE PIGMENTS

The present invention relates to a process for the manufacture of deep-shade pure 3,4,9,10-perylenetetracarboxylic acid dianhydride pigments, wherein the dry crude pigment is finely ground and the ground product is treated with a liquid organic swelling agent.

3,4,9,10-perylenetetracarboxylic acid dianhydride is a known pigment which is used, in particular, for coloring plastics and paints in red shades exhibiting outstanding fastness to light and to weathering. In order to achieve the requisite color strength, purity of shade and good dispersibility, it is necessary to convert the crude pigment, obtained in the manufacturing process, into a finely disperse, stable form. The known processes, for example precipitation in the presence of a dispersing agent (cf. German Printed Application No. 1,806,403), treatment of the powdered crude pigment with sulfuric acid of a specific concentration (cf. German Pat. No. 1,241,605) or treatment of a precipitated product with certain organic solvents (cf. German Published Application No. 2,025,289) give a product which does not always satisfy high requirements, in particular with regard to color strength, purity of shade and dispersibility in the medium which is to be pigmented.

We have now found that a deep-shade, pure 3,4,9,10-perylenetetracarboxylic acid dianhydride pigment exhibiting excellent dispersibility can be obtained by grinding the dry crude pigment, optionally in the presence of solid grinding aids, until the average primary particle size is 0.01 to 1 $\mu$ and treating the ground material with a primary or tertiary aromatic amine which is liquid at the treatment temperature, or with a strongly polar organic solvent, as swelling agent, until the pigment has acquired approximately its optimum color strength, and subsequently removing the swelling agent in a conventional manner.

The starting material for the process of the invention is 3,4,9,10-perylenetetracarboxylic acid dianhydride as obtained by conventional processes, for example by fusion of naphthalic acid. The dry crude pigment is finely ground until an average primary particle size of 0.01 to 1$\mu$, preferably 0.01 to 0.05$\mu$, is attained. Grinding can be carried out in comminution apparatus usually used for grinding pigments, such as mills or attrition mills. Vibration mills and ball mills using iron balls 0.1 to 3 cm in diameter are preferred. Grinding may also be carried out in the presence of the usual amounts of conventional solid grinding aids, such as inorganic or organic salts. However, grinding in the absence of such aids is preferred. A brown to brownish black powder having a metallic gloss is obtained; its particles are largely agglomerated and in this form the powder exhibits inadequate color strength and is insufficiently pure to be used for pigmentation purposes. This powder is then treated with an organic swelling agent which is liquid at the treatment temperature. Examples of suitable swelling agents for the process of the invention are:

1. Primary aromatic amines such as phenetidine, xylidine, toluidine, α-napthylamine, aniline, p-chloroaniline, o-phenylenediamine and anisidine, of which aniline, P-chloroaniline, phenetidine and anisidine are preferred.

2. Tertiary aromatic amines such as pyrimidine and, preferably, quinoline.

3. Strongly polar aprotic organic solvents such as dimethylformamide, N-methylpyrrolidone, dimethylsulfoxide, acetonitrile and acrylonitrile, of which dimethylformamide is preferred.

A suitable weight ratio of pigment to swelling agent is 1:0.5 to 1:5, preferably 1:1 to 1:2, the lower limit being as a rule determined by the flow of the mixture.

The treatment can be carried out by stirring, shaking or kneading the mixture, or by simply letting it stand at an elevated temperature. Treatment temperatures are advantageously from 50° to 200°C, preferably from 80° to 130°C. A treatment time of about 1 to 10 hours, depending on the treatment temperature, suffices to obtain a pigment of optimum color strength. The progress of the treatment can be followed by observing the crystal growth of samples under the microscope or electron microscope. As a rule, the pigment has attained optimum color strength when the average particle size has reached about twice to five times the average particle size of the ground material. Pigments having an average particle size of from about 0.03 to 0.1$\mu$ are particularly valuable. If grinding is carried out in the presence of grinding aids, it is usually not necessary to remove the grinding aids before carrying out the treatment with the swelling agent.

Following the treatment, the pigment is separated from the swelling agent by a conventional method, for example by adding water which contains a little acid to ensure the requisite acid precipitating conditions, and filtering the mixture, and the pigment is then washed and dried. A red pigment of high color strength and excellent dispersibility is obtained. The shade of the pigment can be shifted toward yellow or blue and the full shade (pure shade) of the pigment can be varied from clear to opaque by varying the treatment time, treatment temperature and swelling agent. The pigments produced by the process of the invention exhibit excellent fastness to light and weathering and are therefore particularly suitable for use in surface coatings. The average size of the pigment particles should preferably be about twice the particle size of the crude pigment after grinding.

The advantageous properties and consequently the usefulness of the pigments obtained by the present process were unexpected, especially because the product obtained on treatment with solvents which have proved themselves in conventional finishing processes, such as alcohols, for example butanol, ketones, for example methyl ethyl ketone, ethers, for example dioxane, or aromatics, for example xylene or nitrobenzene, is not suitable for pigmentation purposes. Furthermore, it would have been expected that in the case of the treatment with primary amines (1) the acid anhydride groups of the pigment would have reacted with the functional groups of the swelling agent under the conditions used for the treatment, which would have produced undefined, cloudy pigment mixtures.

Finally, the superior tinctorial value of the pigments of the invention as compared with the 3,4,9,10-perylenetetracarboxylic acid dianhydride pigments obtained according to German Printed Application No. 1,806,403 and German Published Application No. 2,025,289 is surprising, since the particle sizes of the products obtained according to the process of the present invention and of those obtained according to the said applictions are of the same order of magnitude.

In addition to the abovementioned use in the manufacture of surface coatings, particularly nitrocellulose lacquers, cellulose lacquers, polyester coatings, epoxide coatings, silicone resin coatings, alkyd coatings and varnishes, the pigments according to the invention are particularly suitable for coloring plastics sucy as polyvinyl chloride, polyethylene, polystyrene, polyurethane and polyamide, and polymer dispersions, and for the manufacture of printing inks, including offset inks.

The invention is further illustrated by the following Examples in which parts and percentages are by weight.

EXAMPLE 1

400 g of 3,4,9,10-perylenetetracarboxylic acid dianhydride are shaken for 24 hours in a 4 l vibration mill filled with 3.5 kg of iron balls having a diameter of 1 to 2.5 cm. This treatment converts the initially reddish powder into a brownish powder having a metallic gloss, an increased bulk density and an average particle size of 0.01 to $0.05\mu$ 50 parts of this powder in 50 parts of dimethylformamide are stirred for 8 hours at 90 to 100° C. 500 parts of water at 90° C and 10 parts of 30 percent strength sulfuric acid are then added to the mixture and the whole is stirred for a further 2 hours at 80° to 90° C. The product is then suction filtered whilst hot, the dimethylformamide is washed out with hot water, and the residue is dried and ground. A deep red pigment having an average particle size of 0.03 to $0.1\mu$ in the dispersed state is obtained. A transparent coating is obtained using this pigment.

EXAMPLE 2

A mixture of 600 parts of p-chloroaniline and 2,000 parts of water is stirred with 300 parts of finely ground 3,4,9,10-perylenetetracarboxylic acid dianhydride powder, obtained as described in Example 1, for 5 hours in a closed vessel at a temperature of from 95° to 100° C, under autogenous pressure. 1,000 parts of 20 percent strength hydrochloric acid are then run in, the mixture is stirred for a further hour at 90° C and the pigment is suction filtered whilst hot, washed until free of p-chloroaniline and neutral, and dried. 310 parts of pigment powder having an average particle size of from 0.04 to $0.1\mu$ are obtained; this powder colors linseed oil or surface coatings in very pure red shades of high color strength. The dry powder contains 3.5% of chlorine.

The p-chloroaniline can be reprecipitated from the mother liquor by adding sodium hydroxide solution and can be reused, without additional drying, for the pigment finishing process.

EXAMPLE 3

If the procedure described in Example 2 is followed except that p-chloroaniline is replaced by the same quantity of p-phenetidine, 305 parts of a pigment powder whose tinctorial properties are the same as those of the pigment powder produced according to Example 2 are obtained.

EXAMPLE 4

The procedure of Example 2 is followed, but p-chloroaniline is replaced by the same quantity of anisidine. 305 parts of a pigment which has the same properties as that described in Example 2 or 3 are obtained.

EXAMPLE 5

A mixture of 300 parts of quinoline, 1,000 parts of water and 300 parts of 3,4,9,10-perylenetetracarboxylic acid dianhydride which has been ground as described in Example 1 is stirred for 10 hours at 120° C. It is then cooled to 80° C, acidified with 1,000 parts of 20 percent strength hydrochloric acid and stirred for a further 30 minutes at 80° C. The product is then suction filtered whilst hot, washed until free of quinoline and neutral, dried and powdered in a laboratory mill. A deep, readily dispersible, pure red pigment which is similar to that produced according to Example 1 is obtained.

The quinoline can be precipitated from the mother liquor by adding alkali, isolated and reused for the pigment finishing process.

EXAMPLE 6

400 parts of dimethylformamide and 200 parts of 3,4,9,10-perylenetetracarboxylic acid dianhydride which has been ground as described in Example 1 are heated at 120° C for 10 hours. 2,000 parts of water and 10 parts of 20 percent strength hydrochloric acid are then mixed in, the mixture is stirred for a further 2 hours at 80° to 90° C and the product is suction filtered whilst hot and washed until free of dimethylformamide and neutral. A deep, pure red pigment similar to that produced according to Example 1 is obtained.

EXAMPLE 7

200 parts of 3,4,9,10-perylenetetracarboxylic acid dianhydride and 200 parts of sodium chloride are ground for 24 hours in a 4 l vibration mill, as in Example 1. After removing the balls, the ground material is heated with 300 parts of p-chloroaniline and 500 parts of water to 120° C for 8 hours under autogenous pressure. The pressure is released, the mixture is stirred with 300 parts of 35 percent strength hydrochloric acid and 3,000 parts of water for 3 hours at 80° to 90° C and the product is suction filtered whilst hot, washed with dilute hydrochloric acid until free of p-chloroaniline, and subsequently washed until neutral. The filter residue is dried in a through-circulation dryer at 80° C.

A particularly pure, red pigment giving a clear coating is obtained.

I claim:

1. A process for the manufacture of a deep-shade 3,4,9,10-perylenetetracarboxylic acid dianhydride pigment, which process comprises:

grinding the initial pigment in dry crude form until its average primary particle size is 0.01 to $1\mu$;

then treating the resulting ground pigment at a temperature of from 50° to 200° C. with a liquid consisting essentially of a swelling agent selected from the group consisting of primary or tertiary aromatic amines which are liquid at the treatment temperature, dimethyl formamide, N-methyl-pyrrolidone, dimethylsulfoxide, acetonitrile or acrylonitrile, the ratio of said ground pigment to swelling agent being from 1:0.5 to 1:5 parts by weight, said treatment being carried out for a period of time sufficient for the pigment to acquire approximately its optimum color strength; and removing the swelling agent from the thus treated pigment.

2. A process as claimed in claim 1 wherein the treatment with said swelling agent is carried out at a temperature of from 80° to 130° C.

3. A process as claimed in claim 1 wherein the swelling agent is selected from the group consisting of p-chloroaniline, anisidine and phenetidine.

4. A process as claimed in claim 1 wherein the swelling agent is dimethylformamide.

5. A process as claimed in claim 1 wherein the swelling agent is quinoline.

6. A process as claimed in claim 1 wherein the initial dry crude pigment is ground in the presence of solid grinding aids.

7. A process as claimed in claim 1 wherein the initial dry crude pigment is ground to an average primary particle size of from 0.01 to 0.05 $\mu$.

8. A process as claimed in claim 7 wherein the ground pigment is treated with said swelling agent until the average particle size reaches a value of from 0.03 to 0.1 $\mu$.

* * * * *